US00RE37461B1

(19) United States
(12) Reissued Patent
Izumitami

(10) Patent Number: US RE37,461 E
(45) Date of Reissued Patent: Dec. 4, 2001

(54) SPECTACLE LENS HOLDING STRUCTURE

(75) Inventor: Yukihiro Izumitami, Tokyo (JP)

(73) Assignee: Hoya Corporation, Tokyo (JP)

(21) Appl. No.: 09/373,146

(22) Filed: Jun. 30, 1999

Related U.S. Patent Documents

Reissue of:
(64) Patent No.: 5,646,706
Issued: Jul. 8, 1997
Appl. No.: 08/568,514
Filed: Dec. 7, 1995

(30) Foreign Application Priority Data

Dec. 21, 1994 (JP) ..... 6-318636

(51) Int. Cl.[7] ..... G02C 1/02
(52) U.S. Cl. ..... 351/110; 351/121; 351/154; 351/178
(58) Field of Search ..... 351/110, 103, 351/106, 140, 144, 149, 154, 121, 178; 30/286; 83/879, 880, 881; 408/704, 705

(56) References Cited

U.S. PATENT DOCUMENTS 2,588,505 * 4/1952 Ellis ..... 351/106
3,846,017 * 11/1974 Ferrell ..... 351/106
4,692,001 * 9/1987 Anger ..... 351/110
5,544,985 * 8/1996 Lane ..... 408/705 X

FOREIGN PATENT DOCUMENTS

38312/93 * 12/1993 (AU) .
WO96/12983 * 5/1996 (WO) .
WO96/18127 * 6/1996 (WO) .

OTHER PUBLICATIONS

Hoya News, 1994–10, No. 112, Oct. 1994.
Hoya Collection, Oct. 1994.
Eyeglasses, Eyeglasses Composite Profession Journal, Oct. 15, 1994, No. 445.

* cited by examiner

*Primary Examiner*—Huy Mai
(74) *Attorney, Agent, or Firm*—Sughrue, Mion, Zinn, Macpeak & Seas, PLLC

(57) ABSTRACT

A frame for rimless spectacles is provided which has no protuberances projecting from both surfaces of lenses, provides an improved effective field of view, and can be fabricated with ease. Blind holes are formed in nose- and temple-side edge surface portions of each spectacle lens, respectively. A pin-like projection is formed on each of nose-side and temple-side contact plates, and is inserted and fixed in the corresponding blind hole by using an adhesive.

14 Claims, 16 Drawing Sheets

SPECTACLE LENS HOLDING STRUCTURE

Matter enclosed in heavy brackets [ ] appears in the original patent but forms no part of this reissue specification; matter printed in italics indicates the additions made by reissue.

*STATEMENT OF RELATED APPLICATIONS*

*This application is the parent reissue application of divisional reissue application Ser. No. 09/343,269 of U.S. Pat. No. 5,646,706, filed on Jun. 30, 1999.*

BACKGROUND OF THE INVENTION (1) Field of the Invention

The present invention relates to a holding structure for spectacle lenses, and more particularly, to a spectacle lens holding structure suited for use in rimless spectacles.

(2) Description of the Related Art

In recent years, rimless spectacles have been attracting attention because of their advantages such as wide field of view and lightness in weight. Rimless spectacles are classified into two types, that is, a type called semi-rimless spectacles in which lenses are suspended by means of nylon thread wound round the lower edges thereof, and a type called two-point or three-piece type in which lenses are supported by means of screws fitted into holes formed through the lenses. In the former type of lens holding structure, an upper edge portion of each lens is fitted in a metal part, a nylon thread is laid along a groove cut in a lower edge portion of each lens, and the opposite ends of the thread are fastened to the upper metal part, whereby the lenses are suspended. In the latter type of lens holding structure, small screw holes of about 1.4 mm in diameter are bored through portions of each lens close to the right and left edges thereof, respectively, and screws are inserted through the holes to attach the lenses to lens holding members such as a bridge, endpieces, straps, etc. (see Unexamined Japanese Utility Model Publication No. 4-63419 and Unexamined Japanese Patent Publication No. 63-6521, for example).

In the conventional holding structure for the semi-rimless spectacles, however, each lens must first be ground so that the peripheral edge thereof may be flat, and then a groove must be cut along the entire peripheral surface (edge surface) of the lens. Thus, in the case of a lens with a small thickness, considerable skill is required to cut a groove, and the thickness between the groove and the lens surface may become so small that the lens may be chipped when the spectacles are dropped.

In the holding structure for the two-point or three-piece type spectacles, screw holes must be formed through each lens. Therefore, when a screw hole is bored from one side to the other of the lens, the edge of the open end on the other side of the lens may be chipped, making the machining difficult. Further, the lens may crack when a screw hole is bored; therefore, screw holes must be formed at a distance from the edge of the lens. If, however, screw holes are formed at a distance from the edge of the lens, a problem arises in that the screw holes and holding sections associated therewith obstruct the field of view. Further, since lens holding members such as screws and nuts protrude from both surfaces of the lens, they form an obstacle when the lens surfaces are wiped up.

Furthermore, it is necessary that the screw holes be bored perpendicularly or obliquely with respect to the lens surface. Also, the screw holes must be bored at accurate positions with respect to the edge of the lens so that an endpiece or a bridge can be firmly fixed, but since the lens has a spherical surface, the drill bit can easily slip off along the spherical surface of the lens, requiring a great deal of skill in the machining.

SUMMARY OF THE INVENTION

The present invention was created in view of the above circumstances, and an object thereof is to provide a structure for holding the lenses of rimless spectacles which structure is capable of securely holding the spectacle lenses without using members that protrude from both surfaces of the lenses, such as screws or nuts, which provides an improved effective field of view, and which can be fabricated with ease.

To achieve the above object, the present invention provides a spectacle lens holding structure for use in rimless spectacles, which comprises a lens holding member for holding a spectacle lens, the lens holding member having a surface which is disposed in contact with the spectacle lens and on which a projection is formed, the projection being inserted and fixed in a blind hole formed in the spectacle lens.

Preferably, the blind hole is formed in the edge surface of the spectacle lens.

The lens holding member holds the spectacle lens in such a manner that the projection thereof is inserted and fixed in the blind hole formed in the spectacle lens, whereby a holding structure is obtained which does not use screws, nuts or like members and which can securely hold the spectacle lenses without causing looseness or unstableness of the spectacle lenses. Further, since the holes are not through holes, there is no possibility of the spectacle lenses being cracked, making the fabrication of spectacles easy. Also, the spectacle lenses can be held at their peripheral edge portions, thus providing an improved effective field of view.

Furthermore, since the blind holes are formed in the edge surfaces of the spectacle lenses, the effective field of view can be further improved, and this feature is particularly advantageous for progressive lens or multifocal lens with which near distance is viewed frequently. In this arrangement, moreover, the projection of the lens holding member is inserted and fixed perpendicularly or slightly obliquely with respect to the edge surface of the lens; therefore, it is possible to eliminate unnecessary protuberances projecting from the lens surfaces, making it easy to wipe up the lens surfaces and refining the design of the spectacles.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIGS. 7(a), 7(b) illustrate drilling directions, wherein FIG. 7(a) is a view showing an example of drilling in which a hole is cut perpendicularly to an edge surface, and FIG. 7(b) is a view showing an example of drilling in which a hole is cut parallel with a lens surface;

FIGS. 9(a), 9(b), and 9(c) illustrate examples of irregularities formed on the projection, wherein FIGS. 9(a), 9(b), and 9(c) show first, second and third examples, respectively;

FIGS. 10(a), 10(b) illustrate the structure of a bridge forming part of a nose-side lens holding member according to another embodiment, wherein FIGS. 10(a) and 10(b) are front and plan views, respectively;

FIGS. 11(a), 11(b) illustrate the connection of the bridge to a spectacle lens, wherein FIG. 11(a) is a view showing how the bridge having the structure shown in FIGS. 10(a) and 10(b) is connected to a spectacle lens, and FIG. 11(b) is a view showing how the bridge having the structure shown in FIG. 4 is connected to a spectacle lens;

FIGS. 12(a), 12(b) illustrate a pin member as a component part of a temple-side lens holding member according to another embodiment, wherein FIG. 12(a) is a view showing an original form of the pin member, and FIG. 12(b) is a view showing the shape of the pin member when in use;

FIGS. 14(a), 14(b) illustrate the state in which the pin member is mounted to a spectacle lens, wherein FIGS. 14(a) and 14(b) are front and side views, respectively;

FIGS. 16(a), 16(b) illustrate the relationship between the washer and the pin fitted therethrough, wherein FIG. 16(a) shows the relationship in which the pin is substantially perpendicular to flat surfaces of the washer, and FIG. 16(b) shows the relationship in which the pin is inclined with respect to the flat surfaces of the washer.

DESCRIPTION OF THE PREFERRED EMBODIMENTS

Embodiments according to the present invention will be hereinafter described with reference to the drawings.

Figure 1:
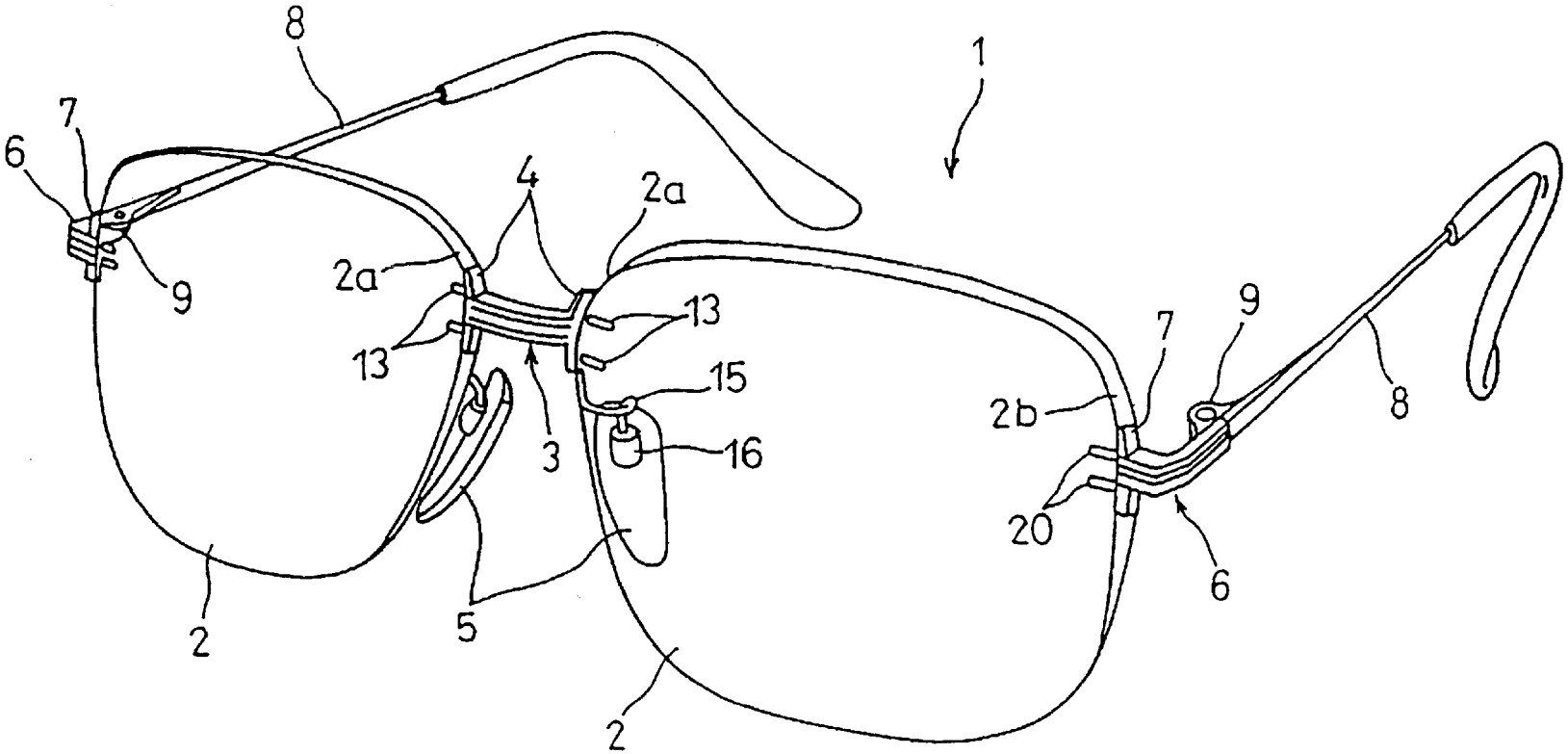
FIG. 1 is a perspective view showing a spectacle lens holding structure according to one embodiment.
Figure 2:
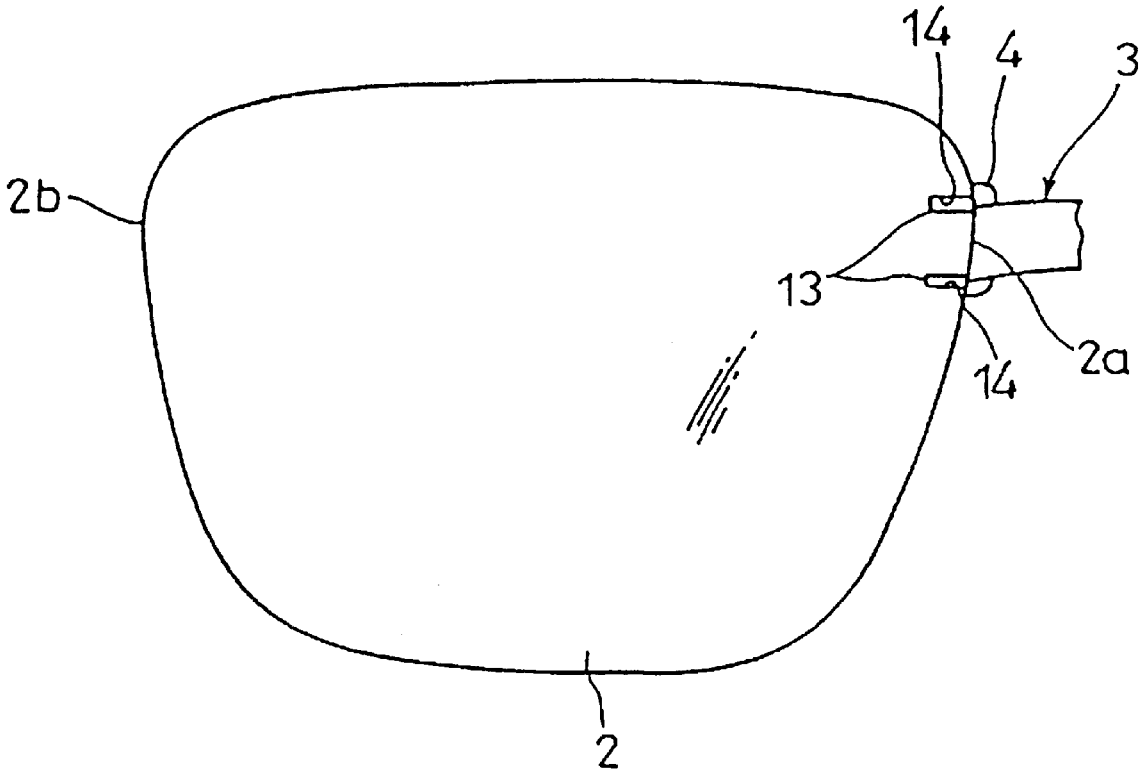
FIG. 2 is a front view of a bridge section.
Figure 3:
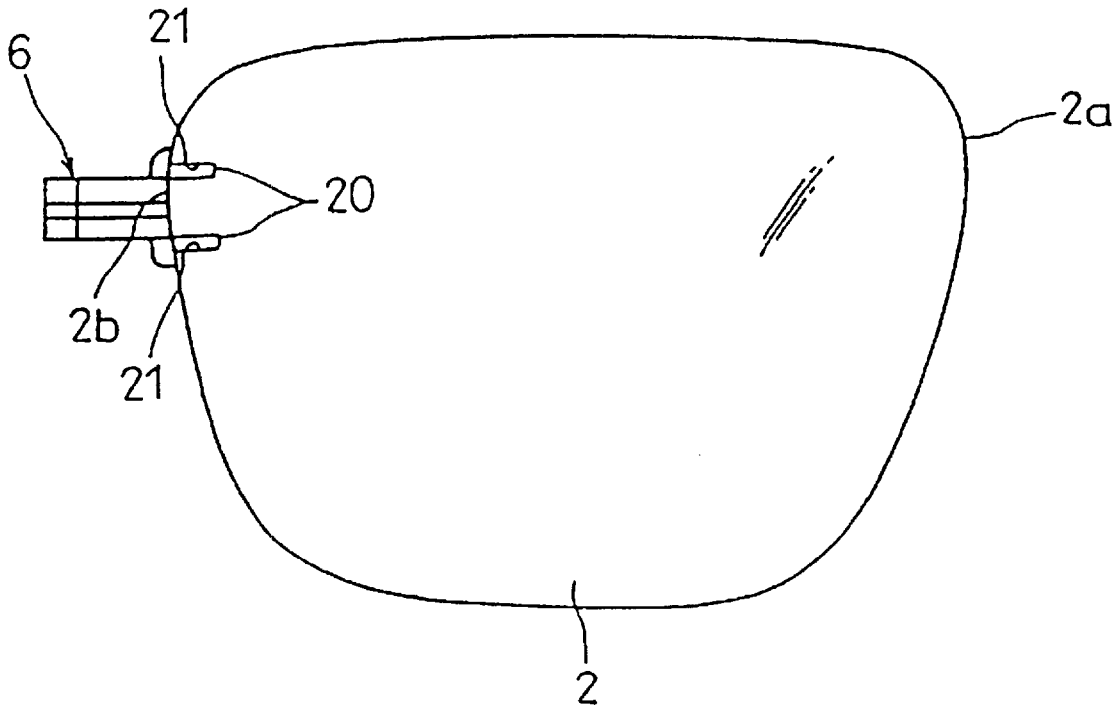
FIG. 3 is a front view of an endpiece section.
Figure 4:
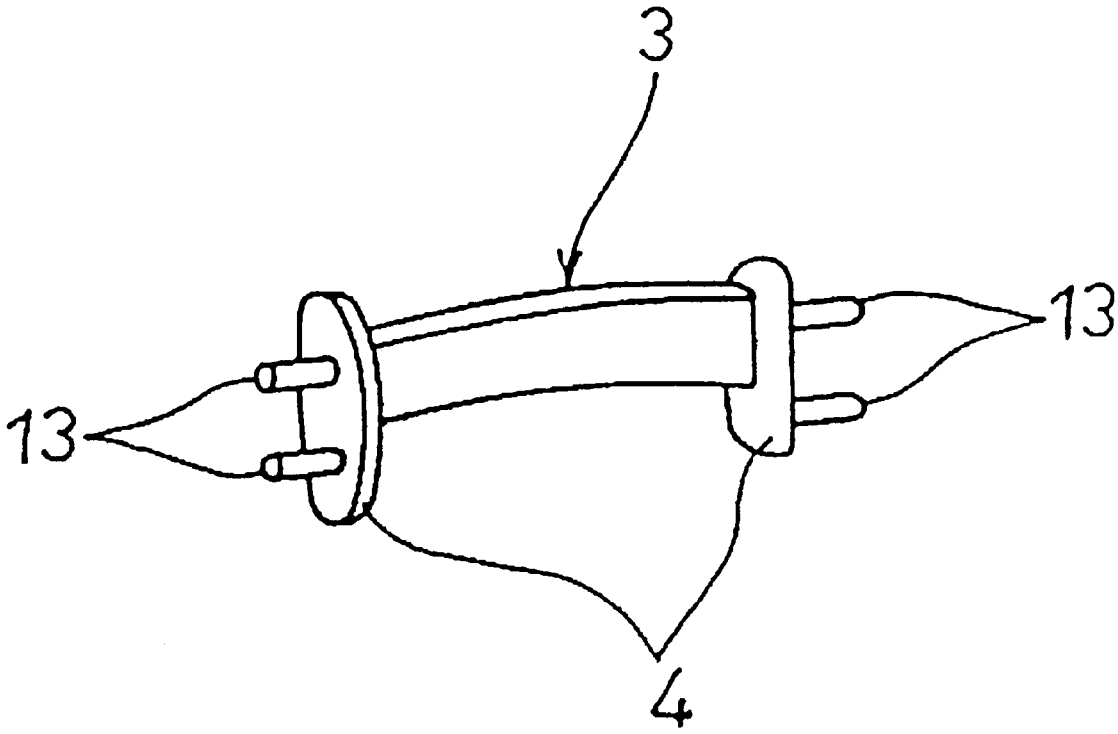
FIG. 4 is a perspective view showing a bridge and nose-side contact plates.
Figure 5:
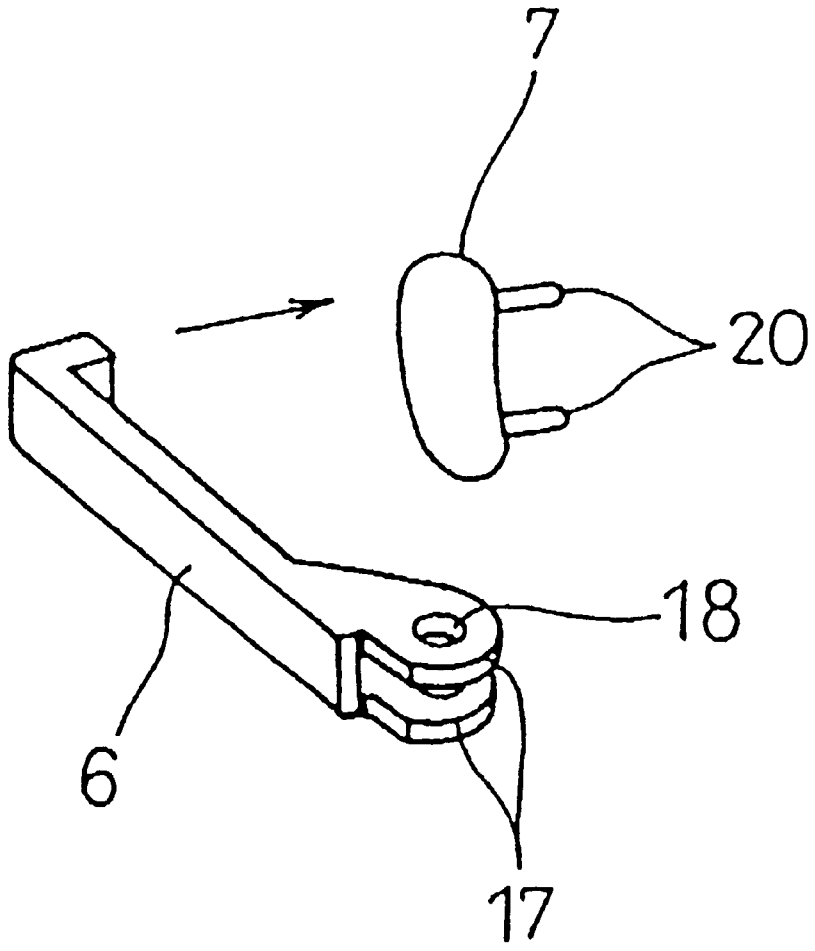
FIG. 5 is an exploded perspective view showing an endpiece and a temple-side contact plate.

FIG. 1 is a perspective view showing a spectacle lens holding structure according to one embodiment of the present invention, FIG. 2 is a front view of a bridge section, FIG. 3 is a front view of an endpiece section, FIG. 4 is a perspective view showing a bridge and nose-side contact plates, and FIG. 5 is an exploded perspective view showing an endpiece and a temple-side contact plate. As shown in these figures, a spectacle frame 1 comprises a bridge 3 arranged between right and left lenses 2, 2, a pair of nose-side contact plates 4, 4 formed integrally with opposite ends of the bridge 3 and holding nose-side edge surfaces 2a, 2a of the respective spectacle lenses 2, 2, a par of right and left pads 5, 5 formed integrally with lower end portions of the respective nose-side contact plates 4, 4, a pair of right and left endpieces 6, 6 arranged at temple-side edge surfaces 2b, 2b of the respective spectacle lenses 2, 2, a pair of right and left temple-side contact plates 7, 7 formed integrally with front ends of the respective endpieces 6, 6 and holding the temple-side edge surfaces 2b, 2b of the respective lenses 2, 2, a pair of right and left temples 8, 8 pivotally connected to rear ends of the endpieces 6, 6, via hinges 9, 9, respectively, etc.

The spectacle lenses 2, 2 are made of a material such as glass, plastic (synthetic resin) or the like. Examples of synthetic resin lenses include allyl lenses made of diethylene glycol allyl carbonate (CR-39) or its mixed copolymers, polycarbonate lenses, acrylic lenses, bisphenol A derivative lenses, and polyurethane lenses. Among these, that particularly suited for use with the spectacle lens holding structure of this embodiment is polyurethane lens because it has excellent properties such as high impact resistance and high tensile strength.

Polyurethane lenses include lenses made of polyisocyanate compound and/or polythiol compound, and those disclosed in Japanese Patents No. 1879252 and No. 1850838, and Japanese Patent Laid-Open Publication No. 4-58489 are particularly suitable.

Those polyurethane lenses provide high bonding strength when assembled with the lens holding members (bridge 3, nose-side contact plates 4, 4, etc.) of this embodiment, and have high resistance to solvents contained in adhesives.

For glass lenses, inorganic glass is generally used.

As the material of the bridge 3, metallic materials may be used which include titanium or titanium alloy, iron alloy, nickel alloy such as nickel silver, monel metal, high nickel alloy or stainless steel, and copper alloy such as bronze or beryllium copper, alternatively, resins such as polyamide, PAS, PES or the like may be used. The bridge 3 and the spectacle lenses 2, 2 are fixed to one another via the nose-side contact plates 4, 4.

The nose-side contact plates 4, 4 serve as lens holding members for holding the upper corners of the nose-side edge surfaces 2a, 2a of the spectacle lenses 2, 2, respectively, and central portions thereof are fixed to opposite ends of the bridge 3 such that the contact plates 4, 4 are directed nearly at right angles to the bridge 3. The nose-side contact plates 4, 4 and the bridge 3 may be made of the same material as a one-piece body, or may be formed separately so that the separate members may be joined together by brazing or the like.

The outer surfaces of the nose-side contact plates 4, 4 are curved so as to be in close contact with the nose-side edge surfaces 2a, 2a of the spectacle lenses 2, 2, and two pin-like projections 13, 13 protrude integrally from each of the outer surfaces. The projections 13, 13, 13, 13 are inserted and fixed in respective blind holes 14 formed nearly perpendicularly or obliquely in the edge surfaces 2a, 2a of the spectacle lenses 2, 2, to thereby hold the lenses 2, 2. When inserting and fixing the projections 13, 13, 13, 13, the projections are inserted into the respective holes 14, 14, 14, 14 with an adhesive applied thereto, whereby the nose-side contact plate 4, 4 can be more firmly joined to the spectacle lenses 2, 2. The use of adhesive is preferred because the adhesive presumably serves to compensate for micro-cracking (invisible cracks) around the holes, optical strain, etc. possibly caused during the formation of the holes 14, 14, 14, 14.

Adhesives to be used include epoxy adhesives (e.g., from Three Bond Co. Ltd.), acrylic adhesives, cyanoacrylate adhesives (e.g., from Three Bond Co. Ltd.), anaerobic adhesives (e.g., from Loctite Corporation.), etc. Epoxy adhesives, in particular, exhibit excellent adhesion properties without regard to lens materials. The adhesive used should have low viscosity, for example, about 3000 poise at 25° C., as well as high transparency. Low-viscosity adhesive forms less bubbles therein and ensures good handling. In the case of using acrylic lenses as the spectacle lenses 2, epoxy adhesive is preferably used because acrylic lenses are generally poor in resistance to specific solvents.

Among the epoxy adhesives, two-pack type adhesives are particularly suitable and easy to use, because they cure at room temperature without the need of special heat-curing process.

Although in this embodiment, two projections 13, 13 are provided for each of the nose-side contact plates 4, 4, their number, length, thickness, shape, etc. may be determined as desired. Further, the holes 14, 14 may have a desired sectional form such as circle, rectangle, or triangle.

Pad arms 15, 15 have upper ends connected to rear-side lower end portions of the respective nose-side contact plates 4, 4 by brazing or the like, and the pads 5, 5 have studs (not shown) tiltably connected by screws (not shown) to respective pad boxes 16, 16 formed integrally with the lower ends of the pad arms 15, 15. FIG. 1 shows the pad arm 15 and the pad box 16 arranged on one side only.

The endpieces 6, 6 are made of the same metallic material as that of which the bridge 3 and the nose-side contact plates 4, 4 are made, or of a resin such as polyamide, PAS or PES, and are bent such that they are L-shaped when viewed in plan. Temple-side contact plates 7, 7 are formed integrally with front ends of the respective endpieces 6, 6, and a pair of knuckles 17 (see FIG. 5) forming the hinge 9, 9 protrudes integrally from the inner surface at the rear end portion of each endpiece 6, 6. A screw hole 18 is formed in the center of each knuckle 17 to allow a screw to pass therethrough.

The endpieces 6, 6 are fixed to the spectacle lenses 2, 2 via the temple-side contact plates 7, 7, respectively, like the connection structure of the bridge 3 and the spectacle lenses 2, 2. The temple-side contact plates 7, 7 serve as holding members for holding the upper corners of the temple-side edge surfaces 2b, 2b of the respective spectacle lenses 2, 2. Therefore, the temple-side contact plates 7, 7 are required to have rigidity large enough to withstand deformation strength. In this embodiment, the temple-side contact plates 7, 7 are made of a high nickel material (which contains 85% nickel and 10% chromium, the remainder being copper and other elements), each formed into a vertically elongate plate, and are joined integrally to the front end portions of the respective endpieces 6, 6 by brazing or the like.

Inner surfaces of the temple-side contact plates 7, 7, that is, the surfaces which are brought into close contact with the temple-side edge surfaces 2b, 2b of the spectacle lenses 2, 2, are formed integrally with pin-like projections 20, 20, 20, 20. Like the aforementioned projections 13, 13, 13, 13 of the nose-side contact plates 4, 4, the projections 20, 20, 20, 20 are inserted into respective blind holes 21, 21, 21, 21 formed in the outer edge surfaces 2b, 2b of the spectacle lenses 2, 2 and firmly secure thereto by an adhesive, thus holding the spectacle lenses 2, 2.

An example of procedure for making holes in the lenses 2 of the spectacle frame 1 constructed as above will be now described.

Figure 6:
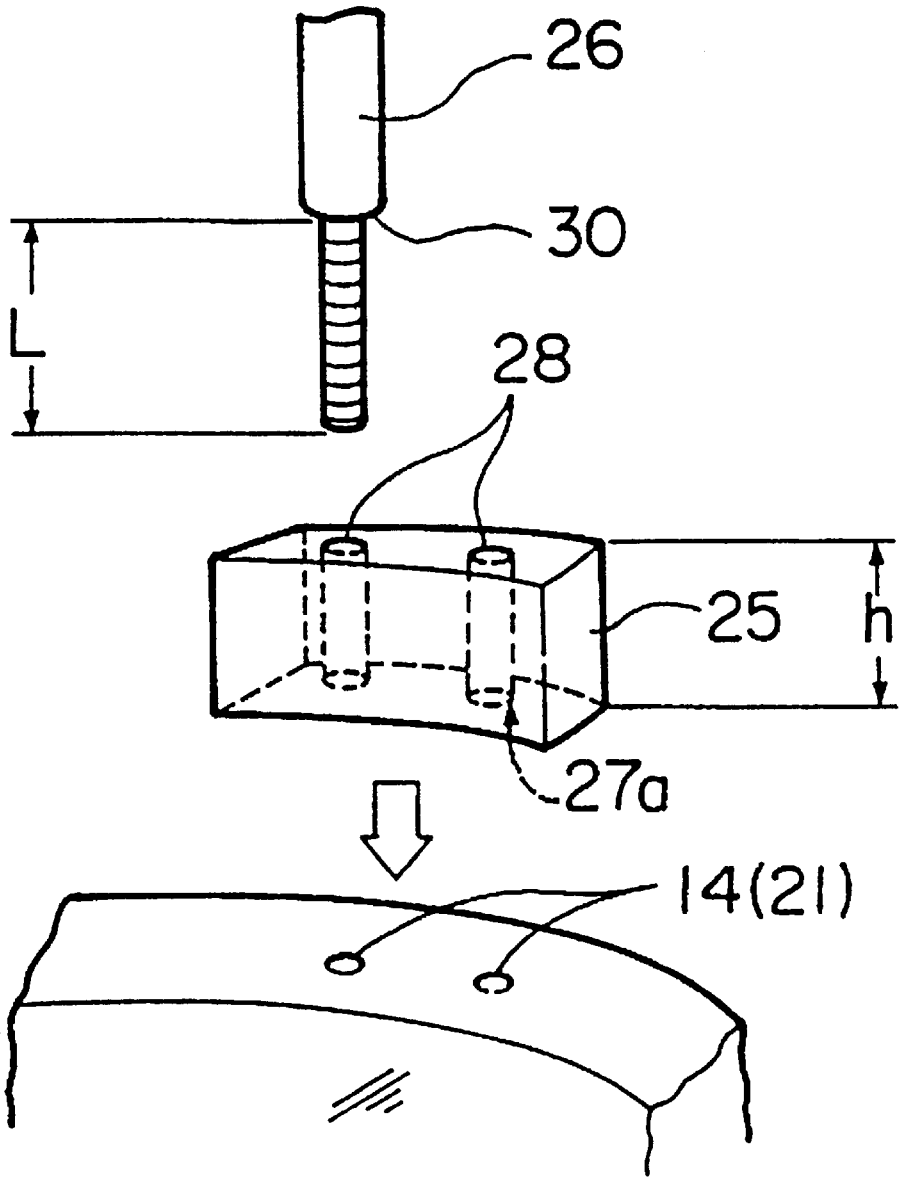
FIG. 6 is a view illustrating a drilling operation carried out on a spectacle lens.

In this embodiment, holes must be cut in the nose-side edge surface 2a and temple-side edge surface 2b of each spectacle lens 2, as described above. The hole cutting can of course be carried out by using a numerically controlled general-purpose milling machine with the spectacle lens 2 accurately held in position, however, the equipment required is very expensive and it is not practical to install such a large-scale machine in an ordinary optician's shop. Therefore, in this embodiment, a hole-cutting guide 25 is fixed to the spectacle lens 2 at a location where holes are to be made, as shown in FIG. 6, and a hole is cut with a step-type pivot drill 26 inserted through the hole-cutting guide 25, whereby the holes 14, 21 can be easily cut in the edge surfaces 2a, 2b of the spectacle lens 2.

A surface 27a at which the hole-cutting guide 25 is affixed to the spectacle lens 2 is previously machined in accordance with the curved shape of a portion of the spectacle lens 2 in which holes are to be made, and then the surface 27a is given adhesiveness with the use of an adhesive double coated tape or the like, whereby the hole-cutting guide 25 can be affixed with accuracy to the predetermined position on the spectacle lens 2. The hole-cutting guide 25 has guide holes 28 formed therethrough. The holes 28 are spaced from each other at an interval equal to that of the projecting pins 13 or 20 of the nose-side or temple-side contact plates 4 or 7 and serve to guide the step-type pivot drill 26.

The operator temporarily affixes the hole-cutting guide 25 to the predetermined position on the spectacle lens 2, and carries out drilling operation by inserting the step-type pivot drill 26 into the guide hole 28 formed through the hole-cutting guide 25 until a stepped portion 30 of the drill 26 abuts against the guide 25. In this case, the depth of the holes 14, 21 formed in the spectacle lens 2 is determined by the difference between the cutting length L of the step-type pivot drill 26 and the height h of the hole-cutting guide 25. By following these steps, the operator can cut holes with an accurate depth and an accurate interval at accurate positions of the spectacle lens 2.

Figure 7:
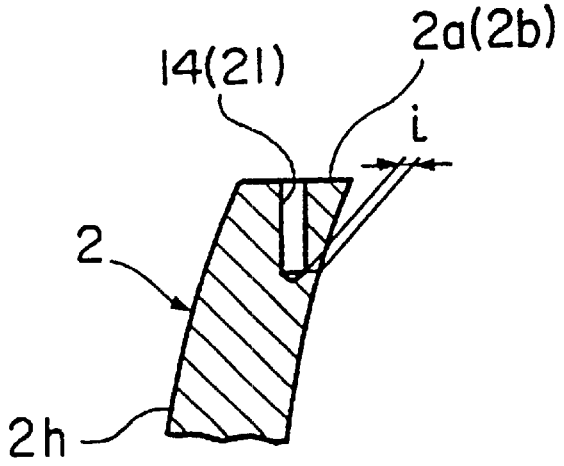
Figure 7:
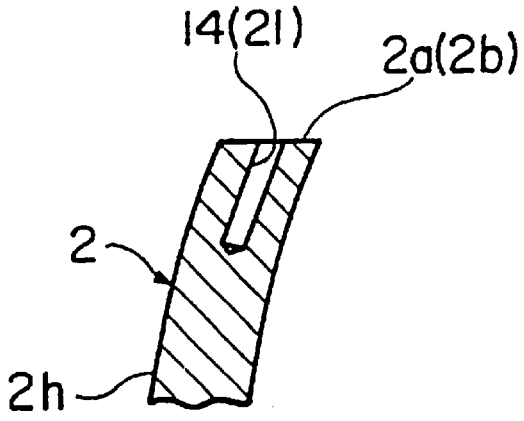

FIGS. 7(a) and 7(b) are sectional views showing the directions of the holes 14, 21 bored in the spectacle lens 2. In this embodiment, the holes 14, 21 are formed in the edge surface of the spectacle lens 2. The direction of the hole 14 (21) may be perpendicular to the edge surface 2a (2b) of the spectacle lens 2, as shown in FIG. 7(a). In this case, however, since the front surface 2h of the spectacle lens 2 is usually convexly curved as shown in FIG. 7(a), the thickness i of the rear side of the lens having a hole formed therein becomes small and thus is low in strength. Therefore, in this embodiment, the hole 14 (21) is obliquely cut in the edge surface 2a (2b) of the lens so as to be generally parallel with the curved front surface 2h, as shown in FIG. 7(b) of, thereby eliminating the drawback.

Thus, in this embodiment, the projections 13, 20 are formed on the nose-side and temple-side contact plates 4, 7, respectively, and are inserted and fixed in the holes 14, 21 formed in the edge surfaces 2a, 2b of the spectacle lenses 2, whereby a holding structure is obtained which does not use screws, nuts or like members and which can securely hold the spectacle lenses 2 without causing looseness or unstableness of the spectacle lenses. Further, since the holes 14, 21 are not through holes, there is no possibility of the lenses 2 being cracked, making the fabrication of spectacles easy. Also, the spectacle lenses can be held at their peripheral edge portions, thus providing an improved effective field of view.

Furthermore, in this embodiment, since the holes 14, 21 are formed in the edge surfaces 2a, 2b of the spectacle lenses 2, the effective field of view can be further improved, and this feature is particularly advantageous for progressive lens or multifocal lens with which near distance is viewed frequently. In this arrangement, moreover, the projections of the lens holding members are inserted and fixed perpendicularly or sightly obliquely with respect to the edge surface of the lens; therefore, it is possible to eliminate unnecessary protuberances projecting from the lens surfaces, making it easy to wipe up the lens surfaces and refining the design of the spectacles.

In the foregoing description, the projections 13 (20) are inserted into the respective holes 14 (21), and in this case, an adhesive may be applied to obtain high bonding strength.

There are various methods for applying an adhesive, for example, a method in which an adhesive is poured into the holes 14 (21), a method in which an adhesive is applied to the projections 13 (20), a combination of these methods, etc. The following is considered to be a preferred method.

Figure 8:
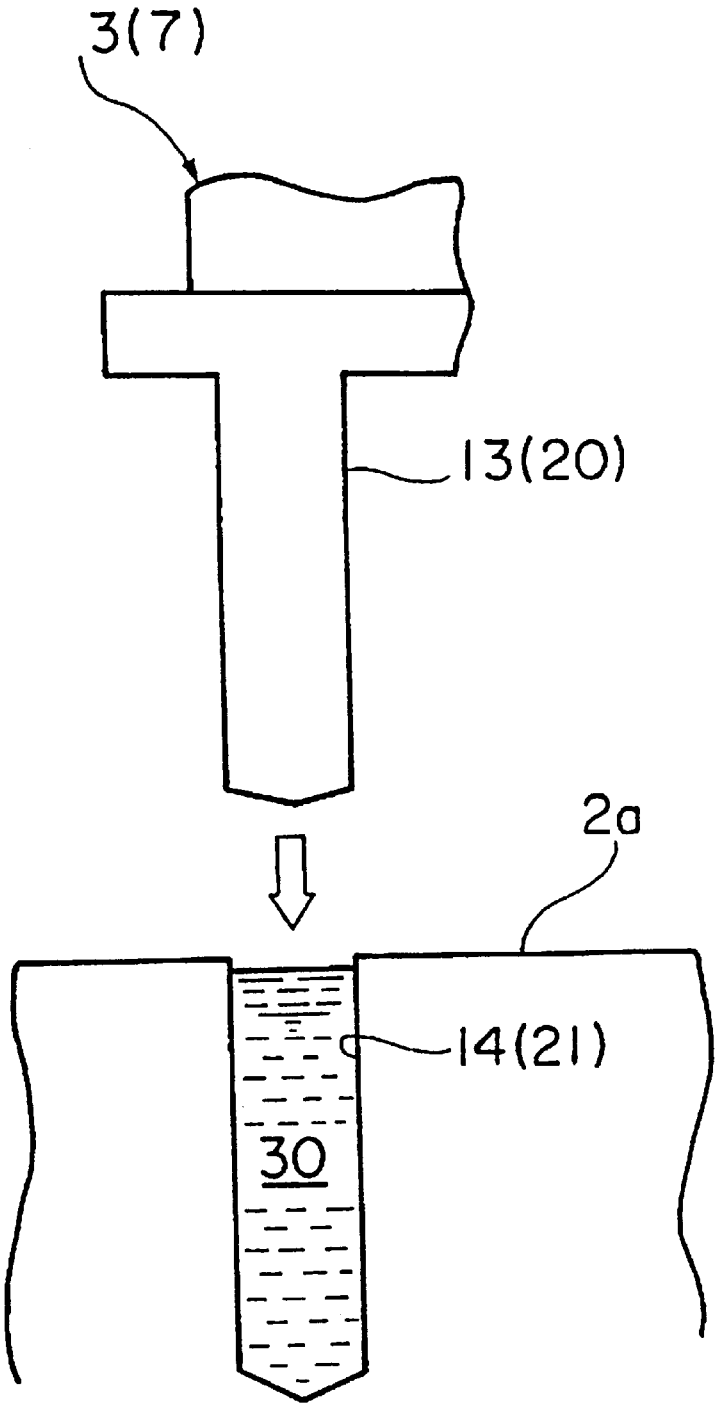
FIG. 8 is a view showing, by way of example, an optimum method of inserting and fixing a projection in a hole of a spectacle lens.

FIG. 8 illustrates, by way of example, an optimum method of inserting and fixing the projections 13 (20) in the holes 14 (21). The holes 14 (21) are previously filed with an adhesive 30 (epoxy adhesive) up to a level close to the open ends thereof, then the projections 13 (20) are inserted into the holes 14 (21) while allowing superfluous part of the adhesive 30 to overflow, and the overflowed adhesive is removed by wiping, for example. As the adhesive 30 in the holes 14 (21) sets, the projections 13 (20) are securely fixed in the holes 14 (21). Thus, by inserting the projections 13 (20) into the holes which are filled with the adhesive 30, bubbles due to polymerization and shrinkage of the adhesive can be prevented from being formed at the bonding portions, thus providing even higher bonding strength and improving the appearance.

Also, the shape of the projections 13 (20) is not limited to a simple pin form, and irregularities may be formed on their surfaces to enhance the bonding strength.

Figure 9:
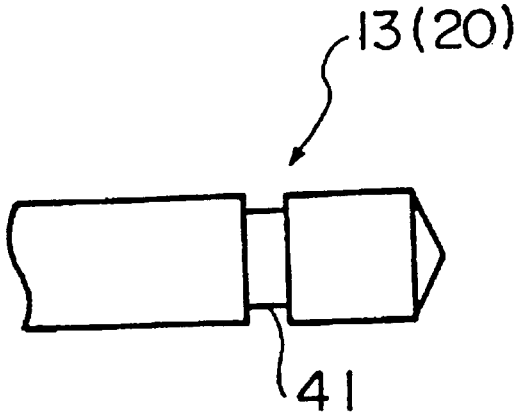
Figure 9:
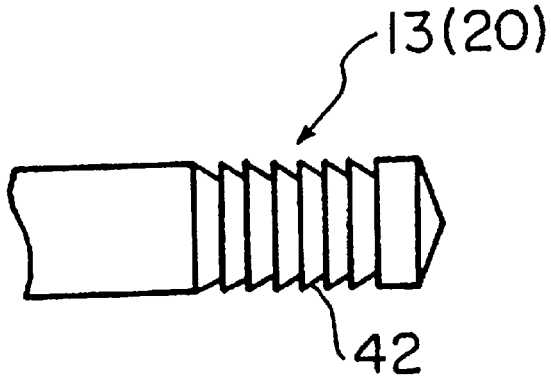
Figure 9:
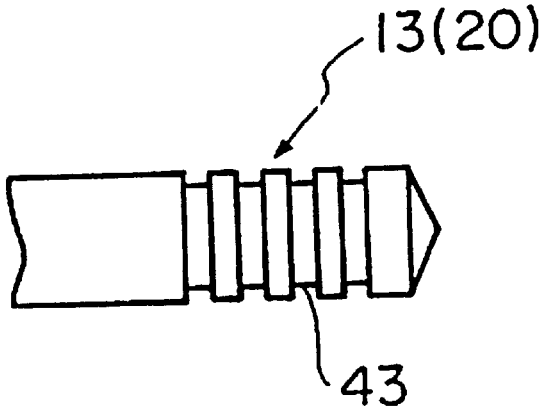

FIGS. 9(a), 9(b), and 9(c) illustrate examples of irregularities formed on the projections 13 (20), wherein FIGS. 9(a), 9(b), and 9(c) show first, second and third examples, respectively. In the example shown in FIG. 9(a), a single annular groove 41 is cut in the surface of the projection 13 (20), in the example of FIG. 9(b), a plurality of annular slant grooves 42 are formed at substantially regular intervals, and in the example of FIG. 9(c), a plurality of annular grooves 43 are formed at substantially regular intervals. The irregularities to be formed are not limited to these and may have other shapes.

A nose-side lens holding member according to another embodiment will be now described.

Figure 10:
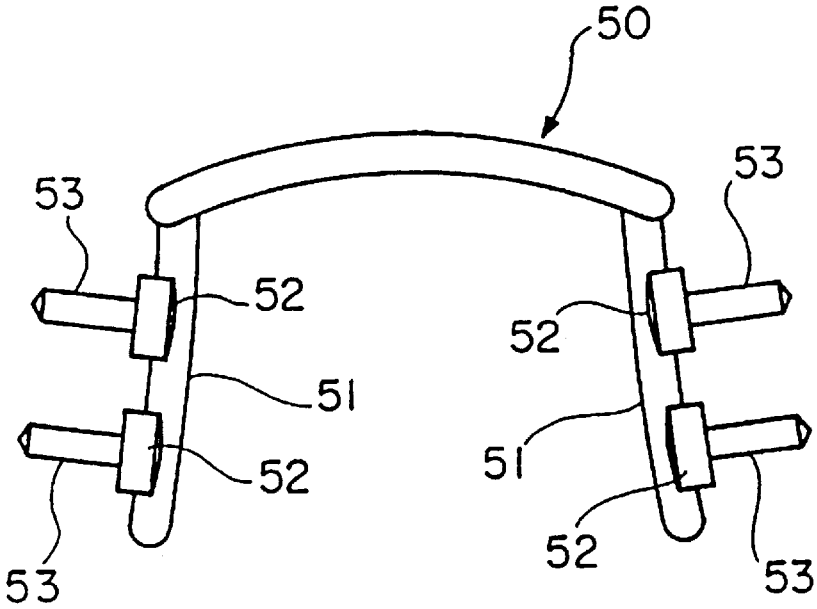
Figure 10:
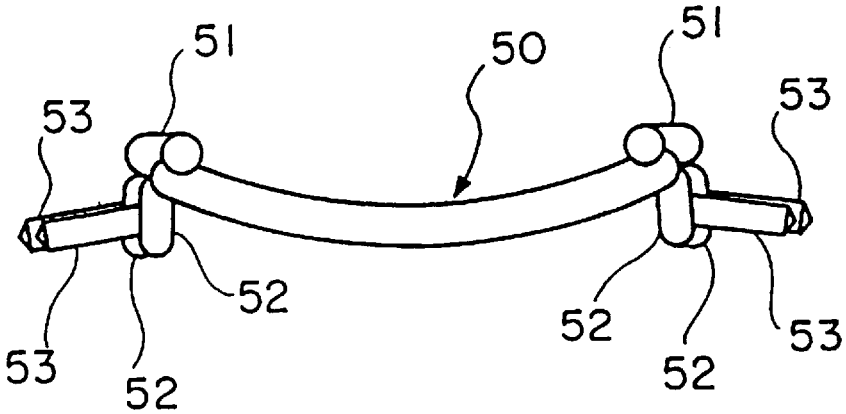

FIGS. 10(a), 10(b) illustrate the structure of a bridge which is part of the nose-side lens holding member according to this embodiment, wherein FIGS. 10 (a) and 10(b) are front and plan views, respectively. In this embodiment, bases 51, 51 are formed on the right and left sides of the bridge 50, respectively. Two nose-side contact plates 52, 52 are formed on each of the bases 51, 51, and a pin-like projection 53 protrudes from each of the nose-side contact plates 52, 52, 52, 52. Each of the nose-side contact plates 52, 52, 52, 52 and the corresponding one of the projections 53, 53, 53, 53 are formed as a one-piece body, and the contact plates 52, 52, 52, 52 are joined to the respective bases 51, 51 by brazing or the like.

As the material of the bridge 50, metallic materials may be used which include titanium or titanium alloy, iron alloy, nickel alloy such as nickel silver, monel metal, high nickel alloy or stainless steel, and copper alloy such as bronze or beryllium copper; alternatively, resins such as polyamide, PAS, PES or the like may be used.

In the bridge 50 having the structure described above, the projections 53, 53, 53, 53 are inserted and fixed in the respective holes 14, 14, 14, 14 of the spectacle lenses 2, 2, as in the case of the aforementioned bridge 3. A preferred inserting and fixing method is that explained with reference to FIG. 8. Also, the shape of the projections 53, 53, 53, 53 should preferably be one of those illustrated in FIGS. 9(a), 9(b), 9(c). Preferably, moreover, the angle of insertion of the projections with respect to the spectacle lenses 2, 2 should be that shown in FIG. 7(b).

Thus, in the bridge 50, the nose-side contact plates 52, 52, 52, 52 are provided corresponding to the respective projections 53, 53, 53, 53, and accordingly, after the projections 53, 53, 53, 53 and their corresponding nose-side contact plates 52, 52, 52, 52 are formed individually as a one-piece body, they can be mounted to the respective bases 51, 51 of the bridge 50. This permits the directions and mounting positions of the individual projections 53, 53, 53, 53 to be finely adjusted with ease and accuracy, thereby improving the operating efficiency.

Further, the arrangement described above facilitates the removal of the bridge 50 and the spectacle lenses 2 at the time of replacement of spectacle lenses, as described below.

Figure 11:
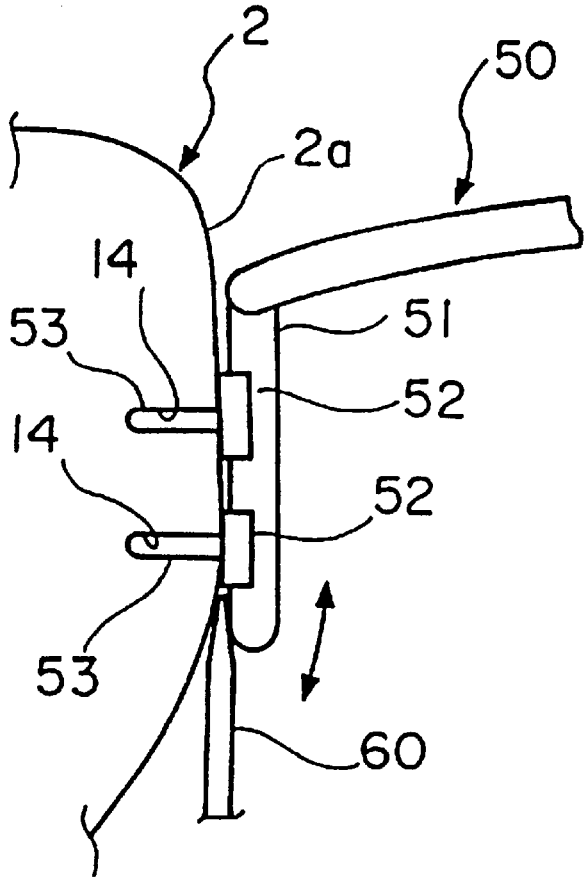
Figure 11:
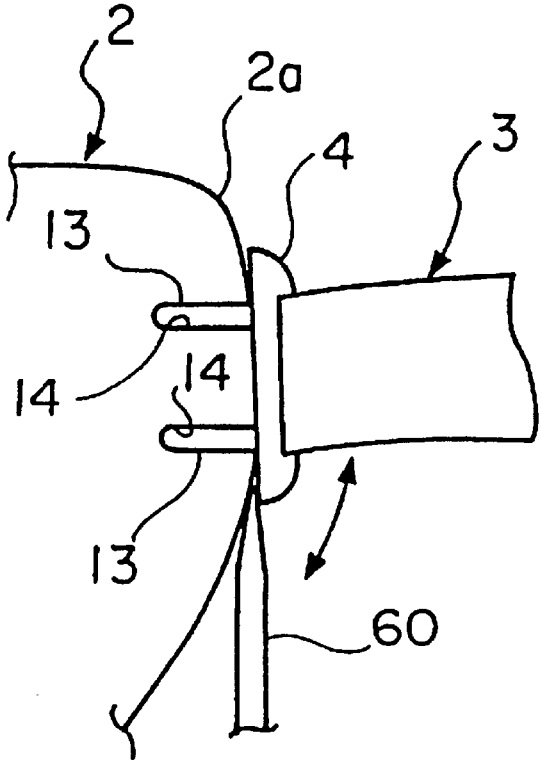

FIGS. 11(a), 11(b) illustrate the connection between the bridge and the spectacle lens, wherein FIG. 11(a) shows how the bridge 50 having the structure shown in FIGS. 10(a), 10(b) is connected to the spectacle lens 2, and FIG. 11(b) shows how the bridge 3 having the structure shown in FIG. 4 is connected to the spectacle lens 2. When detaching the bridge 50 and the spectacle lens 2 for the replacement of lenses, the projections 53, 53 of the bridge 50 must be pulled off from the holes 14, 14 of the spectacle lens 2. This is the case with the bridge 3.

To detach the projections, a lift rod 60 having a wedge-shaped distal end is inserted into a gap between the nose-side contact plate 52, 52 (4) and the edge surface 2a of the spectacle lens 2, and is moved so that the bridge 50 or 3 sways and is detached due to leverage. In this case, the point of application of force coincides with the nose-side contact plate 52, 52 of the bridge 50, and thus load applied to the open ends of the holes 14, 14 of the spectacle lens 2 is small. Consequently, the edges or the like of the holes can be prevented from being chipped.

In the case of detaching the bridge 50 or 3, if it is difficult to insert the distal end of the lift rod 60, the rod 60 may be connected to a terminal of an ultrasonic oscillator so that the distal end of the lift rod 60 is subjected to ultrasonic vibration, whereby the insertion of the rod is facilitated.

A temple-side lens holding member according to another embodiment will be now described.

Figure 12A:
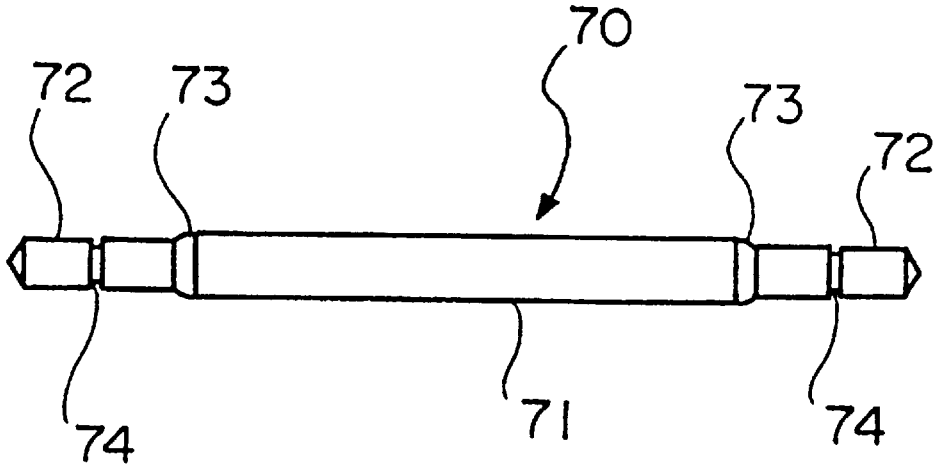
Figure 12B:
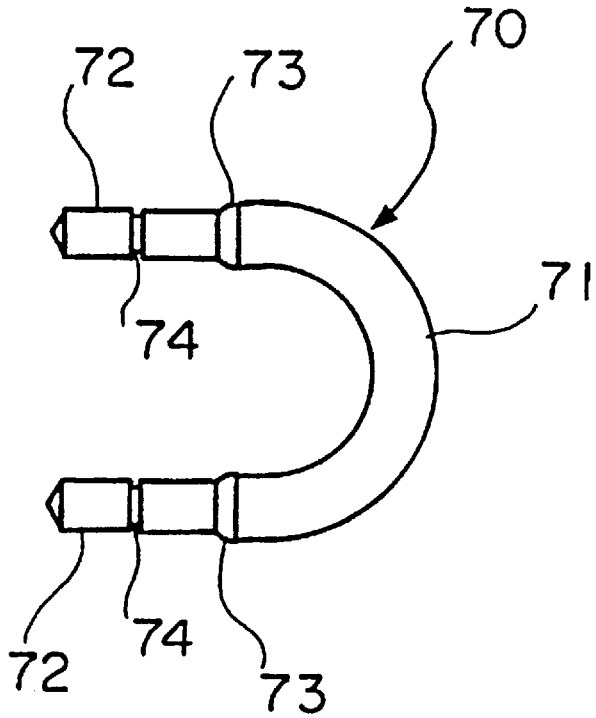

FIGS. 12(a), 12(b) illustrate the shape of a pin member which is a component part of the temple-side lens holding member of this embodiment, wherein FIG. 12(a) shows the original shape of the pin member, and FIG. 12(b) shows the shape of the pin member when in use. The pin member 70 is made of a high nickel material, for example. The pin member 70 is formed such that opposite end portions thereof are smaller in diameter than a body 71 with tapered portions 73, 73 intervening therebetween, and these small-diameter portions serve as pins (projections) 72, 72. The pins 72, 72 are formed such that their length and diameter are substantially equal to the depth and inner diameter, respectively, of the holes 21, 21 of the spectacle lens 2. Annular grooves 74, 74 are cut in repetitive intermediate portions of the pins 72, 72.

The pin member 70 is bent into U-shape so that the pins 72, 72 are substantially parallel with each other, as shown in FIG. 12(b), and the pins are inserted and fixed in the respective holes 21, 21 of the spectacle lens 2.

Figure 13:
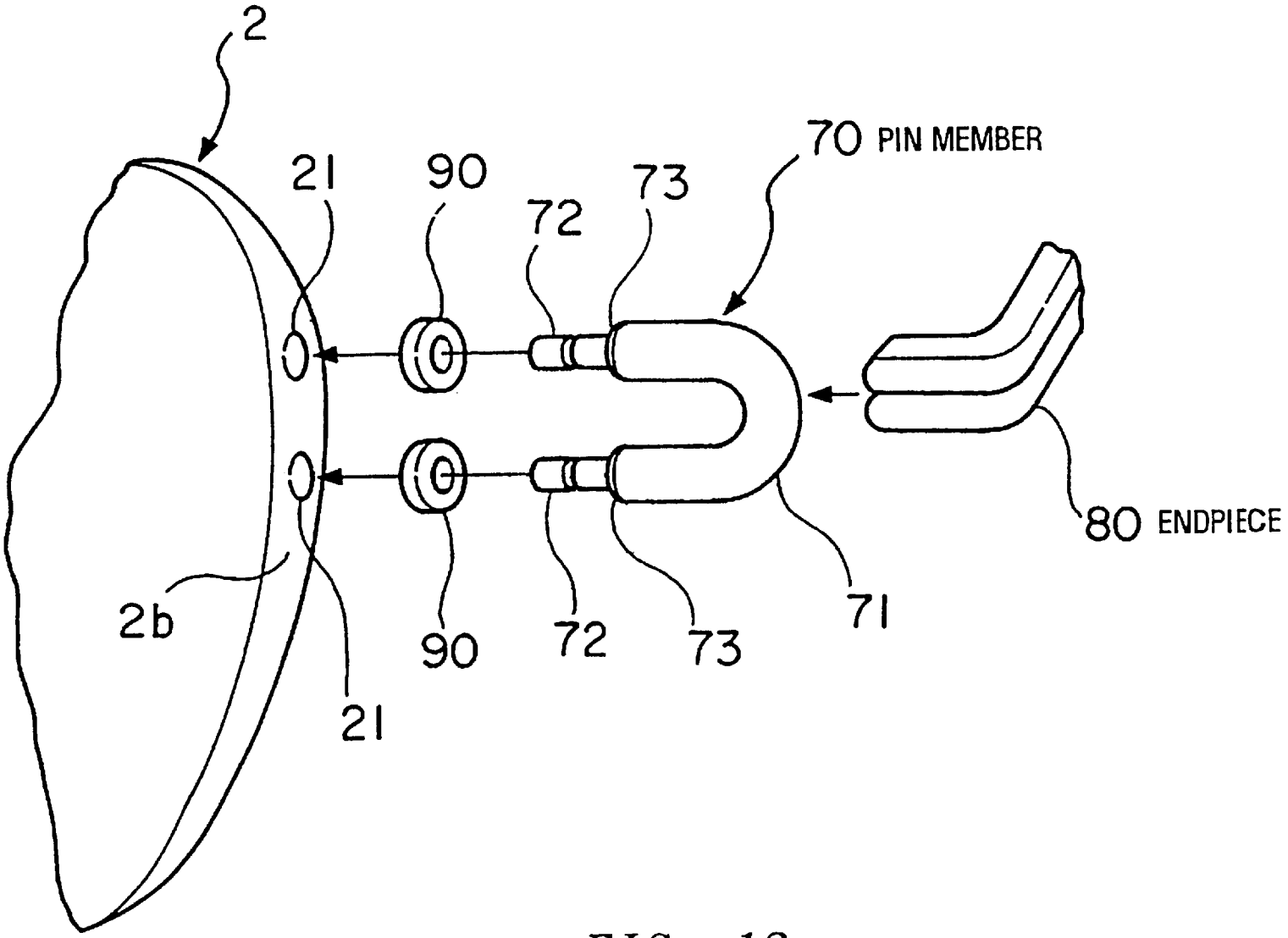
FIG. 13 is a view illustrating a method of mounting the pin member to a spectacle lens.

FIG. 13 illustrates a method of mounting the pin member 70 to a spectacle lens. An L-shaped endpiece 80 is joined to the body 71 of the pin member 70 by brazing or the like. After the endpiece 80 is thus joined to the pin member 70, washers 90, 90 are fitted on the respective pins 72, 72 and located at the respective tapered portions 73, 73. While in this state, the pins 72, 72 are inserted into the respective holes 21, 21 formed in the edge surface 2b of the spectacle lens 2 and are fixed to the lens by an adhesive. In this case, the pins 72, 72 are securely fixed also with the aid of the annular grooves 74, 74 (FIGS. 12(a), 12(b)). Preferably, the insertion and fixing of the pins are carried out by the method explained with reference to FIG. 8.

Figure 14A:
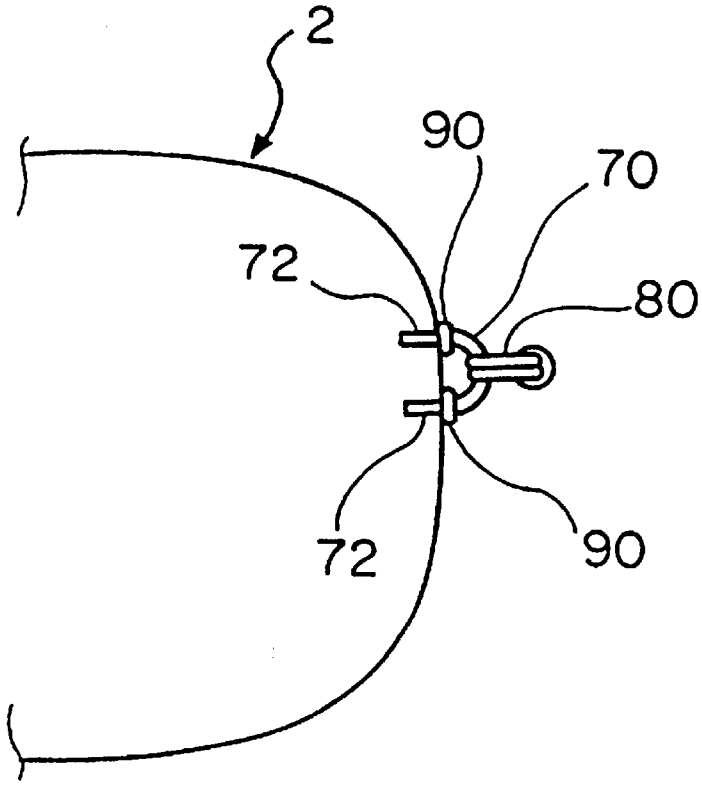
Figure 14B:
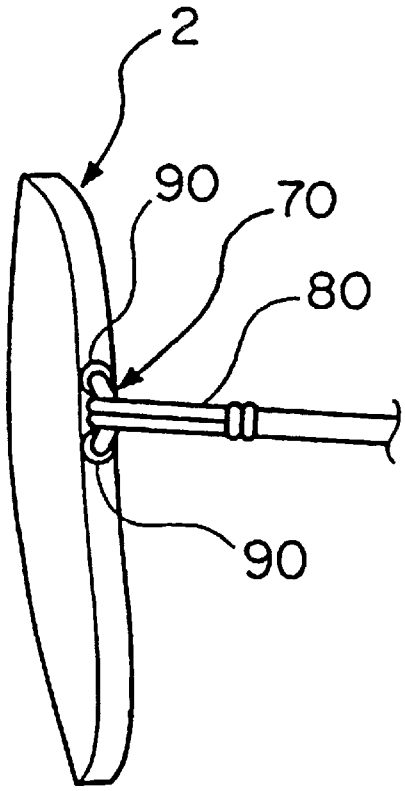

FIGS. 14(a), 14(b) illustrate a state in which the pin member 70 is mounted to the spectacle lens 2, wherein FIGS. 14(a) and 14(b) are front and side views, respectively. The washers 90, 90 have the same function as the temple-side contact plates 52 shown in FIGS. 10(a), 10(b), and 11(a), and the washers 90, 90 and the pin member 70 constitute a temple-side lens holding member. When detaching the pin member 70 from the spectacle lens 2, the point of application of force coincides with the washer 90, 90, whereby load applied to the open ends of the holes 21, 21 of the spectacle lens 2 is small. Consequently, the edges or the like of the holes can be prevented from being chipped.

The flat surfaces of the washers 90, 90 must be brought into close contact with the edge surface 2b in order to ensure sufficient bonding strength with respect to the spectacle lens 2, whereas the pins 72, 72 of the pin member 70 should desirably be inserted parallel with the lens surface, as shown in FIG. 7(b). If the pin member is mounted so as to meet these requirements, then the flat surfaces of the washers 90, 90 are not at right angles to the respective pins 72, 72. Therefore, in this embodiment, the washers 90, 90 are formed into suitable shape as described below.

Figure 15:
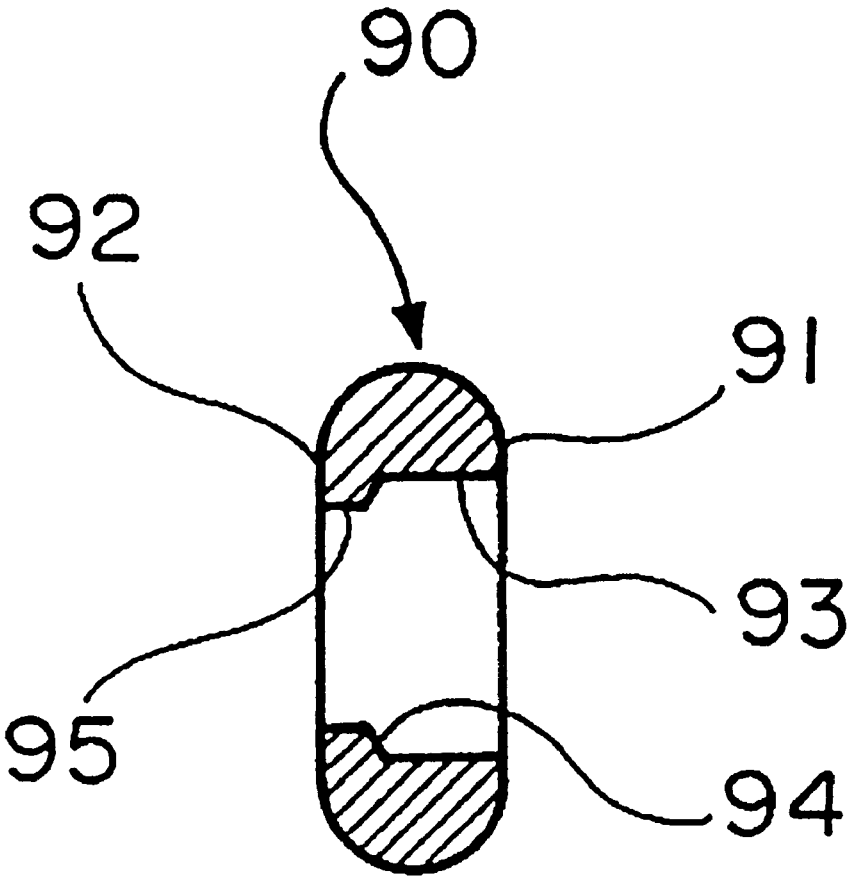
FIG. 15 is a sectional view showing the shape of a washer.
Figure 16:
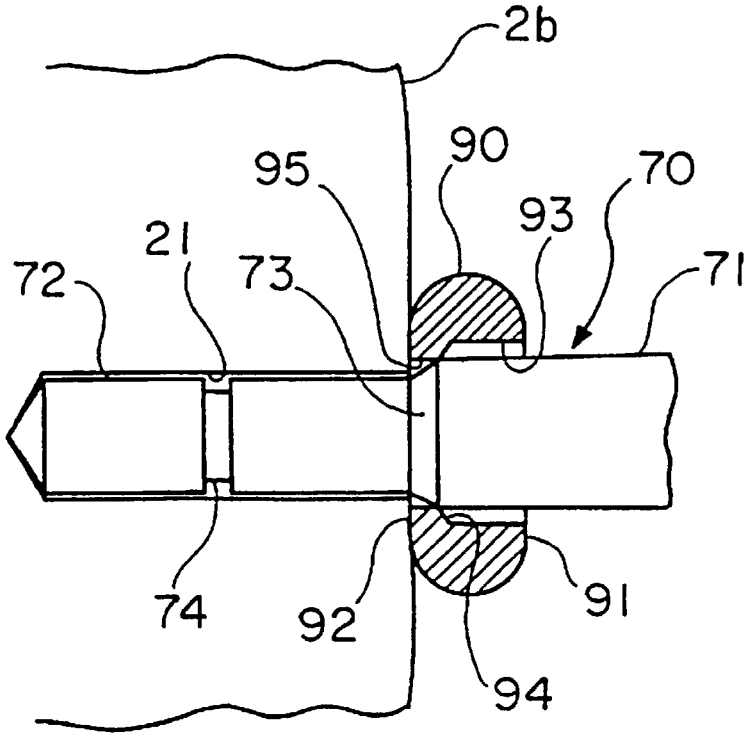
Figure 16:
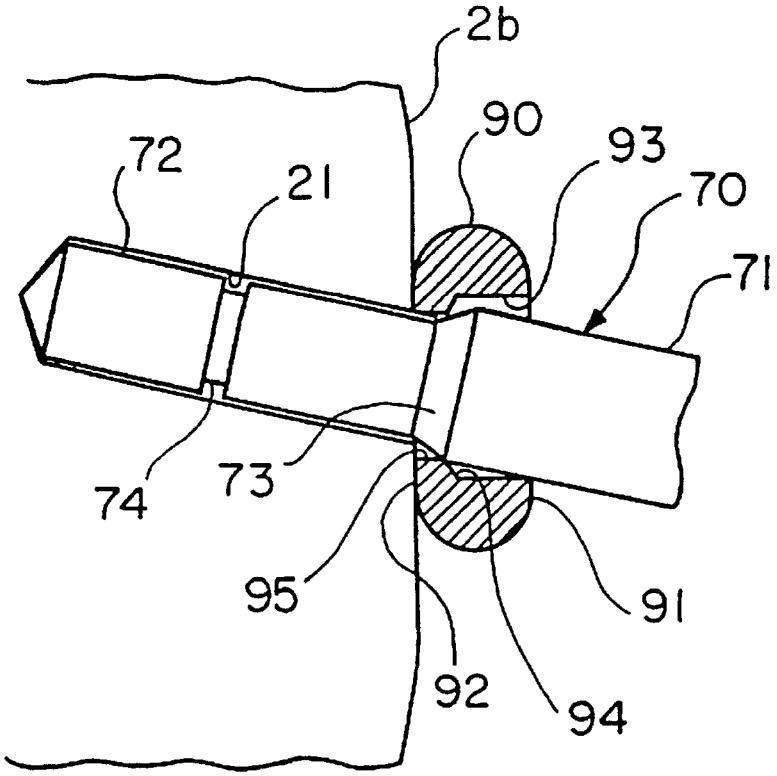

FIG. 15 is a sectional view showing the shape of the washer 90, and FIG. 16 illustrates the relationship between the washer 90 and the pin 72 inserted therethrough, wherein FIG. 16(a) shows a relationship in which the pin 72 is substantially perpendicular to flat surfaces 91, 92 of the washer 90, and FIG. 16(b) shows a relationship in which the pin 72 is inclined with respect to the flat surfaces 91, 92 of the washer 90. As shown in FIG. 15, the washer 90 has inner peripheral surfaces 93, 95 with different diameters on the pin member (70) side and the lens side, respectively. Specifically, the inner peripheral surface 95 is smaller in diameter than the inner peripheral surface 93 and adjoins the surface 93 with a tapered portion 94 intervening therebetween.

As shown in FIG. 16(a), the diameter of the inner peripheral surface 95 is substantially equal to or slightly smaller than that of the body 71 of the pin member 70. Also, the length of the inner peripheral surface 95 is substantially equal to that of the tapered portion 73 of the pin member 70. Accordingly, when the pin member 70 is inserted through the washer 90 along the axis thereof, the boundary between the tapered portion 73 and the body 71 abuts against the inside edge of the inner peripheral surface 95. In this case, the boundary between the pin 72 and the tapered portion 73 is substantially flush with the lens-side flat surface 92 of the washer 90. Consequently, the pin 72 can be securely inserted into the hole 21 of the spectacle lens 2 without leaving any extra space.

In the case where the direction of the hole 21 of the spectacle lens 2 is not perpendicular to the edge surface 2b, a similar relationship holds between the direction of the pin 72 and the flat surfaces 91, 92 of the washer 90, as shown in FIG. 16(b). Thanks to the differences in diameter between various portions of the washer 90 and the pin member 70 and by the action of the tapered portions 73 and 94, the pin member 70 is allowed to tilt over a certain angular range within the washer 90.

Accordingly, with the lens-side edge of the inner surface 95 of the washer 90 held in close contact with the edge surface 2b of the spectacle lens 2, the pin 72 can be inserted into the hole 21 with accuracy.

In the embodiments described above with reference to FIGS. 1 through 16(b), an adhesive is used to securely fix the projections 13, 20, etc. in the holes 14, 21, etc. Instead of using an adhesive, an auxiliary member may be inserted into a hole cut in the lens surface, for example, to thereby securely fix the projections 13, 20. etc. in the holes 14, 21, etc.

In this embodiment, the projections 13 and 20 are integrally formed with the nose-side contact plates 4 and the temple-side contact plates 7, respectively. Instead of these integral projections, separate screws can also be used. When trying to use screws for the projections of the nose-side contact plates 4, for example, through holes are made on the nose-side contact plates 4, and the screws are inserted through the holes. According to the method shown in FIG. 8, the tip ends of the screws are inserted into the holes 14 of the lenses 2 and fixed thereto. In this case, it is preferable to provide in the holes 14 a tubular member, made of resin or paper, having internal threads therein.

Also, in this embodiment, two-point type spectacles are described, however, the present invention can be applied to another type of spectacles, so-called "semi-rimless spectacles," whose lenses are supported by a nylon thread running through a groove made on the edge of the lenses.

As described above, according to the present invention, the projections of the lens holding members are inserted and fixed in the respective blind holes formed in the spectacle lenses, whereby a holding structure is obtained which does not use screws, nuts or like members and which can securely hold the spectacle lenses without causing looseness or unstableness of the spectacle lenses. Further, since the holes are not through holes, there is no possibility of the spectacle lenses being cracked, making the fabrication of spectacles easy. Also, the spectacle lenses can be held at their peripheral edge portions, thus providing an improved effective field of view.

Furthermore, since the blind holes are formed in the edge surfaces of the spectacle lenses, the effective field of view can be further improved, and this feature is particularly advantageous for progressive lens or multifocal lens with which near distance is viewed frequently. In this arrangement, moreover, the projections of the lens holding members are inserted and fixed perpendicularly or slightly obliquely with respect to the edge surface of the lens, therefore, it is possible to eliminate unnecessary protuberances projecting from the lens surfaces, making it easy to wipe up the lens surfaces and refining the design of the spectacles.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

[1. A spectacle lens holding structure for use in rimless spectacles, comprising:

a lens holding member for holding a spectacle lens, said lens holding member having a surface which is disposed in contact with the spectacle lens and on which a projection is formed, the projection being inserted and fixed in a blind hold formed in an edge surface of the spectacle lens.]

2. [The spectacle lens holding structure according to claim 1,] *A spectacle lens holding structure for use in rimless spectacles, comprising:*

*a lens holding member for holding a spectacle lens, said lens holding member having a surface which is disposed in contact with the spectacle lens and on which a projection is formed, the projection being inserted and fixed in a blind hole formed in an edge surface of the spectacle lens,* wherein the projection is fixed in the blind hole by an adhesive *within the blind hole.*

3. The spectacle lens holding structure according to claim 2, wherein the adhesive comprises any one selected from epoxy adhesives, acrylic adhesives, cyanoacrylate adhesives and anaerobic adhesives.

4. The spectacle lens holding structure according to claim 2, wherein the adhesive is a two-pack type adhesive.

5. The spectacle lens holding structure according to claim [1,] *2,* wherein said lens holding member includes a bridge for connecting right and left spectacle lenses, nose-side contact plates arranged at opposite ends of the bridge, respectively, and a projection extending from each of the nose-side contact plates into the blind hole.

6. The spectacle lens holding structure according to claim [1,] *2,* wherein said lens holding member includes an endpiece connected to a temple, a pin member arranged at a distal end of the endpiece and having a projection formed thereon so as to extend into the blind hole, and a temple-side contact plate mounted to a base of the projection of the pin member.

7. The spectacle lens holding structure according to claim 6, wherein the pin member comprises a U-shaped member having the projection formed at each of opposite ends thereof.

8. [The spectacle lens holding structure according to claim 1,] *A spectacle lens holding structure for use in rimless spectacles, comprising:*

*a lens holding member for holding a spectacle lens, said lens holding member having surface which is disposed in contact with the spectacle lens and on which a projection is formed, the projection being inserted and fixed in a blind hole formed in an edge surface of the spectacle lens,* wherein the projection has irregularities formed thereon *and the projection is fixed in the blind hole by adhesive within the blind hole.*

9. [The spectacle lens holding structure according to claim 1,] *A spectacle lens holding structure for use in rimless spectacles, comprising:*

*a lens holding member for holding a spectacle lens, said lens holding member having a surface which is disposed in contact with the spectacle lens and on which a projection is formed, the projection being inserted and fixed in a blind hole formed in an edge surface of the spectacle lens,* wherein the projection is a screw member which is inserted into another hole formed in said spectacle holding member.

10. The spectacle lens holding structure according to claim [1,] *2,* wherein the spectacle lens is mounted on a mount for semi-rimless spectacles.

11. The spectacle lens holding structure according to claim [1,] *2,* wherein the spectacle lens is made of a material selected from polyurethane resins, allyl resins and acrylic resins.

12. The spectacle lens holding structure according to claim [1,] *2,* wherein the blind hole is cut to be generally parallel with a curved surface of the lens.

[13. Rimless spectacles comprising:

a lens holding member for holding a spectacle lens, said lens holding member having a surface which is disposed in contact with the spectacle lens and on which a projection is formed, the projection being inserted and fixed in a blind hole formed in an edge surface of the spectacle lens.]

14. Rimless spectacles [according to claim 13,] *comprising:*

*a lens holding member for holding a spectacle lens, said lens holding member having a surface which is disposed in contact with the spectacle lens and on which a projection is formed, the projection being inserted and fixed in a blind hold formed in an edge surface of the spectacle lens* wherein the blind hole is cut to be generally parallel with a curved surface of the lens.

15. A spectacle lens holding method of rimless spectacles comprising the steps of:

filling a blind hole formed in an edge surface of a spectacle lens with adhesive; and inserting and fixing a projection in the blind hole filled with adhesive, the projection being formed on a surface of a lens holding member and the surface being in contact with the spectacle lens.

16. The spectacle lens holding method of rimless spectacles according to claim 15, wherein the blind hole is cut to be generally parallel with a curved surface of the lens.

* * * * *